Jan. 16, 1968 L. H. HAIBT ET AL 3,364,467

CRYOGENIC FAULT OR ERROR-DETECTION AND CORRECTION DEVICE HAVING SPARE CHANNEL SUBSTITUTION

Filed Dec. 30, 1959 9 Sheets-Sheet 1

INVENTORS
LUTHER H. HAIBT,
JOSEPH D. RUTLEDGE,

BY Thomas & Crickenberger
ATTORNEYS

INVENTORS
LUTHER H. HAIBT,
JOSEPH D. RUTLEDGE,

BY Thomas & Crickenberger
ATTORNEYS

INVENTORS
LUTHER H. HAIBT,
JOSEPH D. RUTLEDGE,
BY Thomas & Crickenberger
ATTORNEYS

INVENTORS
LUTHER H. HAIBT,
JOSEPH D. RUTLEDGE,

BY Thomas & Crickenberger
ATTORNEYS

INVENTORS
LUTHER H. HAIBT,
JOSEPH D. RUTLEDGE,
BY Thomas & Crickenberger
ATTORNEYS INVENTORS
LUTHER H. HAIBT,
JOSEPH D. RUTLEDGE,
BY Thomas & Crickenberger
ATTORNEYS INVENTORS
LUTHER H. HAIBT,
JOSEPH D. RUTLEDGE,
BY Thomas & Crickenberger
ATTORNEYS

INVENTORS
LUTHER H. HAIBT,
JOSEPH D. RUTLEDGE,

BY Thomas & Crickenberger
ATTORNEYS

INVENTORS
LUTHER H. HAIBT,
JOSEPH D. RUTLEDGE,

BY Thomas & Crickenberger
ATTORNEYS 3,364,467

CRYOGENIC FAULT OR ERROR-DETECTION AND CORRECTION DEVICE HAVING SPARE CHANNEL SUBSTITUTION

Luther H. Haibt, Croton-on-Hudson, and Joseph D. Rutledge, Mahopac, N.Y., assignors to International Business Machines Corporation, New York, N.Y., a corporation of New York Filed Dec. 30, 1959, Ser. No. 863,042
3 Claims. (Cl. 340—147)

This invention relates to cryogenic devices and more particularly to such devices employing an error-detection and correction arrangement.

Where information is transmitted from one location to another in machines using cryogenic elements broken lines between locations prevent the accurate transfer of information, and such lines are very difficult to repair since the elements are buried in a liquified gas bath. Thin film lines may serve as conductors between cryogenic elements in different locations. These lines may be broken during the process of manufacture, during temperature cycling or during operation from such causes as overload current or mechanic force such as jarring. Breakage occurring during manufacture may be repaired without difficulty. Breakage during temperature cycling or during actual operation presents the greatest problem. It is felt that the thermal stress on connecting lines as a result of temperature cycling between room temperature and the operating temperature is a usual source of breakage.

It is the practice in some instances to construct machines from a number of plates on which logic or memory circuits are printed. Each plate may have a number of output leads which run to the edge of the plate, and from there connecting wires may run to the input leads of other plates. The interplate wires may be connected to the leads on the plates by solder joints or other suitable form of physical connection. Once properly manufactured and tested, the circuits printed on the plates may be assumed to function with a good degree of reliability. The solder joint or other physical connecting device has a chance of breaking, and it is the breakage at this point and along the interplate wires during submersion in a liquefied bath which creates the problem that this invention is intended to overcome.

In one known device previously employed to overcome this problem an error-detection and correction code is used. Disadvantages arise however, in such an arrangement since the amount of equipment involved in the error-detection and correction code scheme increases greatly as the number of simultaneous, multiple errors which can be detected and corrected increases beyond one. For example, if a well known Hamming error-detecting and correcting code is used which employs four information channels and three code checking channels, detection and correction can be performed with reliability only if one mistake or defect occurs at a given instant of time. Should two errors occur simultaneously, detection might be performed, but correction cannot be performed with reliability, if at all. Accordingly, if two or more errors or defects are to be detected and corrected with reliability, a multiple error-detection and correction code must be resorted to. Such codes entail a large number of channels to carry check bits so that the system tends to become too large for practical applications.

It is a feature of this invention, therefore, to provide an error-detection and correction device which eliminates the need for additional channels to carry code check bits. This simplifies construction and results in economies both in manufacture and in repair. To the extent that construction is simplified and the number of transmission channels is reduced, reliability of performance is improved. According to an illustrative arrangement of this invention, M information channels are provided for conveying information from one location to another along interplate wires or lines. There are S spare channels provided, and any one of these spare channels may be substituted for any defective one of the M information channels.

According to one aspect of this invention it is important to detect the existence of a defective channel without using redundant channels or code checking channels. For this purpose a detection circuit is provided which is coupled to each of the information channels. If one or more of the information channels become defective at any given instant, the detection circuit is able to indicate that multiple errors or defects exist. According to a further feature of this invention a correction circuit is provided which is coupled to the detection circuit and which is operated to correct multiple errors or defects. The correction circuit includes a switch device for switching any one or more of the S spare channels for any one or more of the defective M information channels.

A still further feature of this invention is the provision of a self-repairing arrangement whereby a spare S channel is automatically substituted for any defective M information channel. For this purpose the correction circuit and switching device included therein respond to signals of the detection circuit to perform automatically the switching of spare S channels for defective ones of the M information channels. The automatic substitution of S spare channels for defective M informtaion channels continues as long as there is one or more defective M channels. Once an S spare channel is substituted for a defective M information channel, the spare S channel becomes an M information channel, and should a defect occur, it may be corrected by substituting a further S spare channel. It is emphasized that any number of simultaneously defective M channels may be corrected, and the automatic substitution of spare channels for information channels continues until all of the information channels are restored to error-free operation.

It is another feature of this invention to provide for the use of many spare channels so that error-free transmission may be maintained should a large number of defects occur in the M information channels. For this purpose the number of spare channels S is made as large as desired, consistent with practical and economical limitations. Where the thin film devices are employed the number of spare channels may be on the order of 40 or 50 channels without involving much additional space or weight, and production costs can be maintained within reasonable limits. It is important in operation to remember or keep track of the spare channels which have been used to replace defective channels so as to avoid attempts to use the same spare channel twice. For this purpose a memory device may be employed to prevent the use of a spare channel which has been used previously. The memory device may be operated successively as errors occur to sequentially select unused spare channels as a series of defective M channels occur. In order to maintain the automatic self-repairing aspect, the memory device may be operated by the detection circuit.

Information is normally sent from a register on one plate to a register on another plate. These plates may be referred to as the sending plate and the receiving plate with the registers disposed thereon as the sending register and the receiving register, respectively. When replacing a defective M channel with a spare S channel, both ends of the spare channel must be substituted for both ends of the defective M channel. Accordingly, the detection circuit, the correction circuit and the memory device constitute a circuit arrangement which must be provided on the sending register with a corresponding arrangement being provided on a receiving register so as to substitute both ends of the spare channel for the defective channel.

These and other features of this invention may be more fully appreciated when considered in the light of the following specification and the drawings in which.

Figures 1, 2:
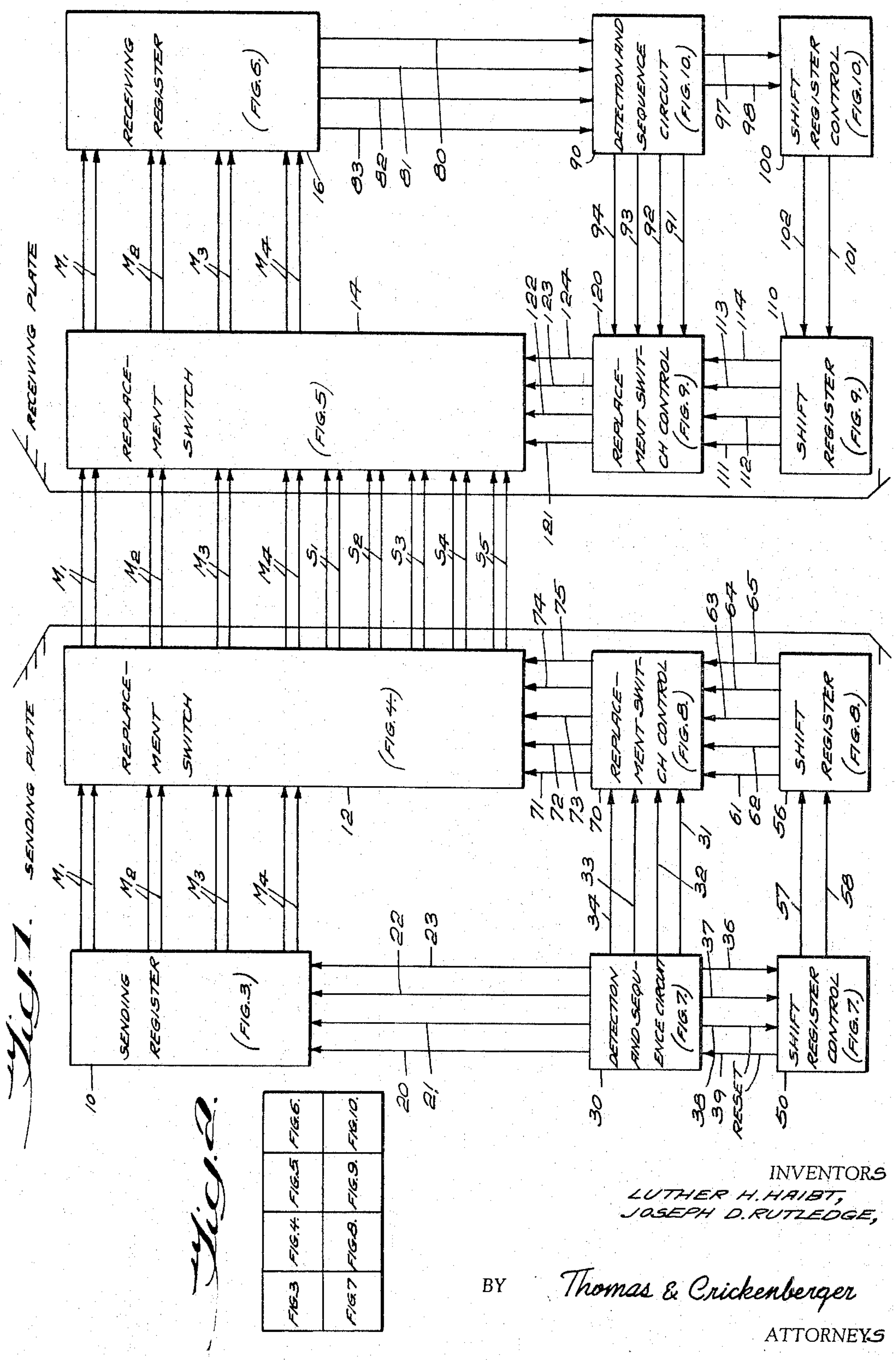
FIG. 1 shows in block form an illustrative arrangement of a system according to this invention.
FIG. 2 shows how FIGS. 3 through 10 should be arranged with respect to one another to formulate the system of FIG. 1.

An illustrative system arrangement according to this invention is illustrated in block form in FIG. 1. A sending register 10 on the sending plate transmits information on channels M1 through M4 via replacement switches 12 and 14 to a receiving register 16 on the receiving plate. The replacement switches 12 and 14 are disposed on the sending plate and the receiving plate, respectively. Spare channels S1 through S5 are disposed between the replacement switches 12 and 14, and any one of these spare channels may be substituted for any defective one of the information channels M1 through M4. The number of information channels and the number of spare channels may be any number desired. As the number of spare channels is increased, the number of repairs which can be made on defective information channels increases, and the period of correct operation may be extended accordingly.

The sending register 10 has a plurality of stages, one stage for each of the transmission channels. Since four information channels M1 through M4 are provided, the sending register 10 has four stages in this instance. The information in each of the stages is sensed by a current on each of the respective lines 20 through 23, and this current flows on either the Zero or the One line of the respective information channel. For example, current on line 20 establishes a current in the One or the Zero line of the channel M1; whereas, current on the line 21 establishes a current on the Zero or the One line of the channel M2. In like fashion current along the lines 22 and 23 is established in the Zero or the One line of the respective channels M3 and M4. The current from the sending register 10 on the One and Zero lines of the information channels M1 through M4 are conveyed as inputs to the receiving register 16. These currents operate the receiving register so that it holds the same information held by the sending register 10.

Should a break occur in one of the current-carrying lines of channels M1 through M4 somewhere between the sending plate and the receiving plate, this condition must be detected before a substitution of a spare channel can be made. The detection of such a fault is made by a circuit 30. This circuit detects the faulty condition, identifies the channel wherein the fault is found and determines the order in which defective channels are corrected in case more than one channel is defective at any given time. The detection and sequence circuit 30 energizes the lines 31 through 34 to correct faults in channels M1 through M4 respectively. If a fault is detected in channel M1, for example, then the line 31 is energized to initiate substitution of a spare channel for the defective channel M1. When the substitution has been made, the line 31 is de-energized. In case a fault is detected in more than one channel simultaneously, the detection and sequence circuit 30 controls the order in which the substitutions are made. Whenever multiple errors occur, the sequence or order of repair is channel M4 before channel M3, channel M3 before channel M2, and channel M2 before channel M1. In case of multiple errors with a defect in channel M4, the line 34 from the detection and sequence circuit 30 is energized, substitution is made, and the line 34 is de-energized. Next, the line 33 is energized if channel M3 is defective, and when substitution is made for this defective channel, the line 33 is deenergized. The corrective process may continue in like fashion for channel M2 and channel M1. Whenever a defect exists and one of the lines 31 through 34 is energized, the line 36 is likewise energized and remains energized until all faults have been corrected. The line 37 is energized whenever no fault exists, and it is de-energized during the period that a fault exists. The lines 38 and 39 are energized with a current pulse each time a spare channel is substituted for a defective channel.

A shift register control 50 responds to current in the lines 36 and 37 and supplies current pulses to a shift register 56 along conductors 57 and 58. The lines 57 and 58 are pulsed at alternate times and cause the shift register 56 to be stepped. The operation of the shift register control 50 in response to current pulses on the lines 36 and 37 is automatic, and the output pulses developed on the lines 57 and 58 to operate the shift register 56 is thus automatic. The shift register 56 is operated once for each defective channel found, and current pulses are developed sequentially on the output lines 61 through 65. The shift register 56 performs as a memory device which prevents used spare lines from being used a second time. Currents on the lines 61 through 65 are applied to a replacement switch control 70.

The replacement switch control 70 responds to current on one of the lines 31 through 34 and to current on one of the lines 61 through 65 to energize one of its output lines 71 through 75 with a current. Whenever one of the lines 71 through 75 is energized with a current, the left-hand end of the next available spare is substituted for the defective channel. The replacement switch 12 responds to an energized one of the lines 71 through 75 to switch the right-hand end of the same spare line to the defective one of the channels M1 through M4.

The detection and sequence circuit 30 acts to detect the existence of a fault, to identify the location of the fault and to control the order in which the faults are corrected in case of multiple faults. The shift register control 50, the shift register 56, the replacement switch control 70 and the replacement switch 12 perform as a correction circuit which automatically substitutes the next spare channel for a defective information channel. These devices perform their assigned functions on the sending plate in FIG. 1 and switch the left-hand end of the next spare S channel to the defective information channel at the replacement switch 12 on the sending plate. The receiving plate in FIG. 1 has similar equipment disposed thereon which switches the right-hand end of the same spare S channel to the defective one of the M channels M1 through M4 at the replacement switch 14 on the receiving plate.

Referring more specifically to the receiving plate portion of FIG. 1, the lines 80 through 83 from the receiving register 16 carry the same currents conveyed along respective lines 20 through 23 of the sending plate. A detection and sequence circuit 90 on the receiving plate energizes the lines 91 through 94 in the same manner that the detection and sequence circuit 30 on the sending plate energizes the lines 31 through 34. Whenever one of the lines 31 through 34 is energized, a corresponding one of the respective lines 91 through 94 is energized, thereby causing simultaneous operation of the replacement switches 12 and 14. When there is no defective channel, current flows in the line 97 from the detection and sequence circuit 90 to a shift register control 100. Whenever a defect occurs in any channel, current ceases to flow in the line 97, but it then flows in the line 98. When the defect is corrected, current flow in the line 98 ceases and current flow is reestablished in the line 97. Current pulses are established alternately in the lines 101 and 102 by the shift register control 100, and these currents operate a shift register 110, causing it to be stepped. The operation of the shift register control 100 in response to current pulses on the lines 97 and 98 is automatic, and the output pulses developed on the lines 101 and 102 to operate the shift register 110 is thus automatic. The shift register 110 is operated once for each defective channel found, and current pulses are developed on the output lines 111 through 114 as successive faults are detected. The shift register 110 serves as a memory device which prevents used spare lines from being used a second time. Currents on the lines 111 through 114 are applied to a replacement switch control 120. A current in one of the lines 91 through 94 and a current in one of the lines 111 through 114 cooperate to operate the replacement switch control 120 to energize one of its output lines 121 through 124. Whenever one of these output lines is energized with a current, the replacement switch 14 is operated, and the next available spare channel is substituted for the defective channel.

If FIGS. 3 through 10 are arranged with respect to one another as shown in FIG. 2, they formulate a preferred arrangement of the system illustrated in FIG. 1. Cryogenic devices are employed, and cryotrons are used in the illustrative arrangement in FIGS. 3 through 10. A cryotron provides an output indicative of which of two loops is carrying a current at any particular time. Each cryotron is represented in FIGS. 3 through 10 as a conventional wire wound cryotron in the interest of providing a more graphic circuit illustration although it is to be understood that the circuit is preferably constructed of thin film devices of the type, for example, shown and described in a copending application, Ser. No. 625,512 filed on Nov. 10, 1956 by R. L. Garwin and assigned to the assignee of this invention.

The circuits of this invention are operated at low temperatures such as by emersion in liquid helium, for example. The circuit lines or wires and the control coil of each cryotron are made of a hard superconductor such as niobium, for instance, and the gate element of each cryotron is made of a soft superconductor such as tantalum, for example. The currents employed create a magnetic field in the control coil which exceeds the critical field of the gate, but the magnetic field does not exceed the critical field of the control coil or the connecting lines or wires.

Figure 3:
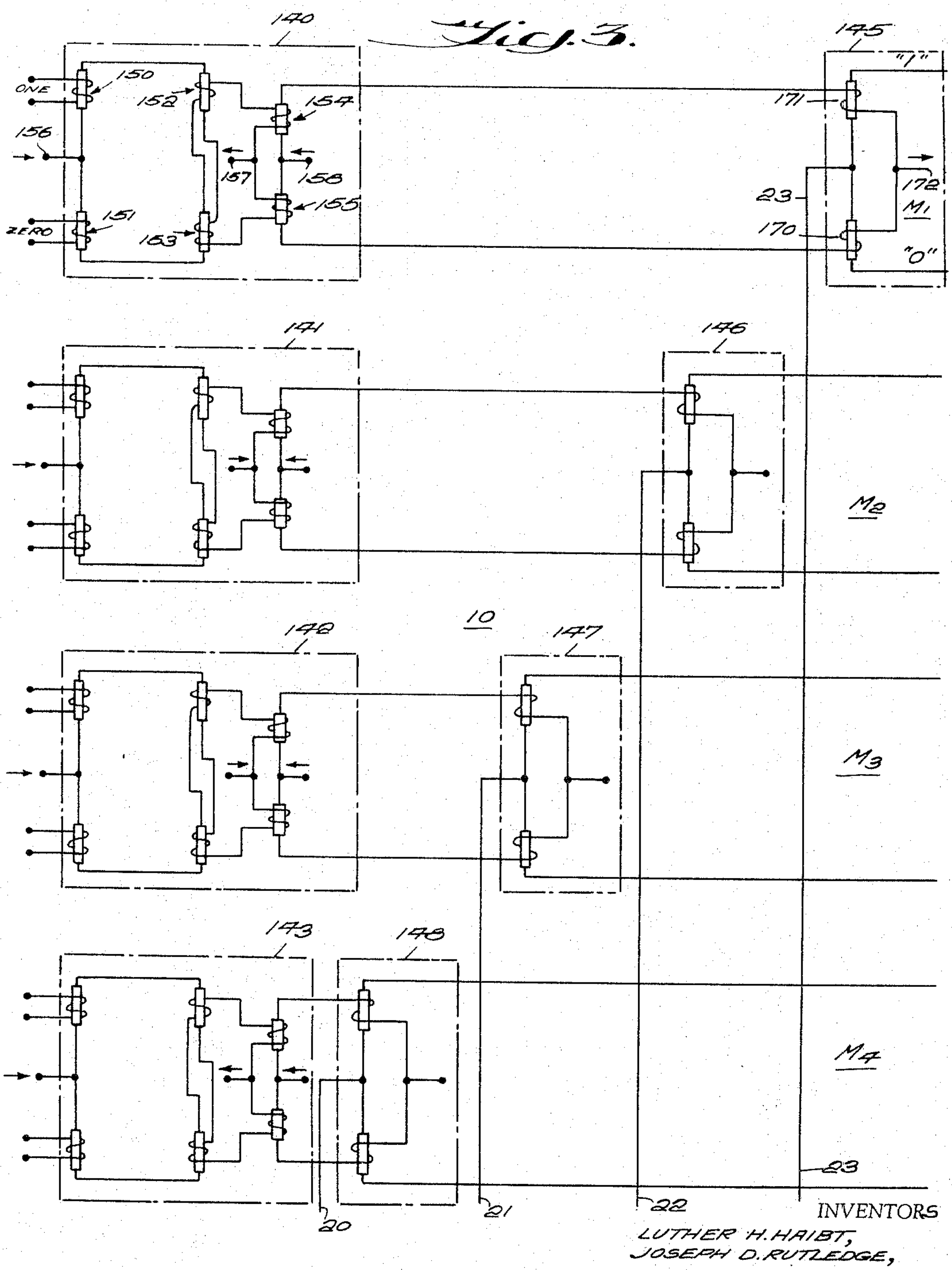
FIG. 3 illustrates in detail the sending register shown in block form on the sending plate in FIG. 1.

Reference is made to FIG. 3 which shows in detail the sending register 10 illustrated in block form in FIG. 1. This register includes four flip-flops 140 through 143 associated with respective buffer circuits 145 through 148 which are coupled to corresponding information channels M1 through M4. The cryogenic flip-flop 140 is composed of cryotrons 150 through 155. The flip-flops 150 and 151 serve as input cryotrons the windings of which are pulsed to divert current from a terminal 156. The cryotrons 152 and 153 are cross-coupled as shown to form a flip-flop, and the cryotrons 154 and 155 serve as output cryotrons which are sampled by a current from a terminal 158 to indicate the state of the flip-flop. Current entering the terminal 156 exits at the terminal 157. This current may travel through either of two alternate paths, the route being determined by the manner in which the coils of the input cryotrons 150 and 151 are energized. If the coil of the cryotron 150 is energized, its gate element is driven resistive, and current from the terminal 156 is diverted through the superconductive gate of the cryotron 151, the superconductive gate of the cryotron 153, the superconductive windings of the cryotrons 152 and 154 and out through the terminal 157. This drives the gate of the cryotrons 152 and 154 resistive. If the input pulse to the winding of the cryotron 150 is terminated, the gate of this cryotron becomes superconductive, but current continues through the path previously indicated because this path is superconductive and the alternate path includes the resistive gate of the cryotron 152. Accordingly, this condition of the cryotron is a stable one, and current from the terminal 158 is diverted by the resistance of the gate of the cryotron 154 through the superconductive gate of the cryotron 155, the winding of a cryotron 170, and out through an exit terminal 172. Current normally flows in the line 23, and it samples the condition of the cryotrons 170 and 171. In this instance current along the line 23 is diverted by the resistance of the gate of the cryotron 170 through the superconductive gate of the cryotron 171, along the One line of channel M1 through FIGS. 4 and 5, through the winding of a cryotron 180 in FIG. 6, then along the line 83 in FIGS. 6 and 10 through the upper winding of cryotron 414, and through the winding of cryotron 424 to ground.

If current is applied to the winding of the input cryotron 151 in FIG. 3, its gate is driven resistive, and current from the terminal 156 is diverted through the superconductive path including the gate of the cryotron 150, the gate of the cryotron 152, the winding of the cryotron 153, the winding of the cryotron 155 and out through the exit terminal 157. Current from the terminal 158 is accordingly diverted by the resistance of the gate of the cryotron 155 through the superconductive path including the gate of the cryotron 154, the winding of the cryotron 171 and to the exit terminal 172. Consequently, current in the line 23 is diverted by the resistive gate of the cryotron 171 through the superconductive gate of the cryotron 170 on to the Zero line of the channel M1. Current flows along this line through FIGS. 4 and 5, through the coil of a cryotron 181 in FIG. 6, then along conductor 83 in FIGS. 6 and 10 through the upper coil of cryotron 414, and through the coil of cryotron 424 to ground. It is seen, therefore, that the flip-flop 140 in FIG. 3 may be set to either of two stable states by pulsing the windings on the cryotrons 150 and 151 thereby to establish current in the respective One or Zero lines of channel M1. The buffer circuit 145 serves to isolate the flip-flop 140 from the One and Zero lines of the channel M1. The flip-flops 141 through 143 and the associated buffers 146 through 148 perform in the same manner as the flip-flop 140 and its associated buffer 145.

Figure 4:
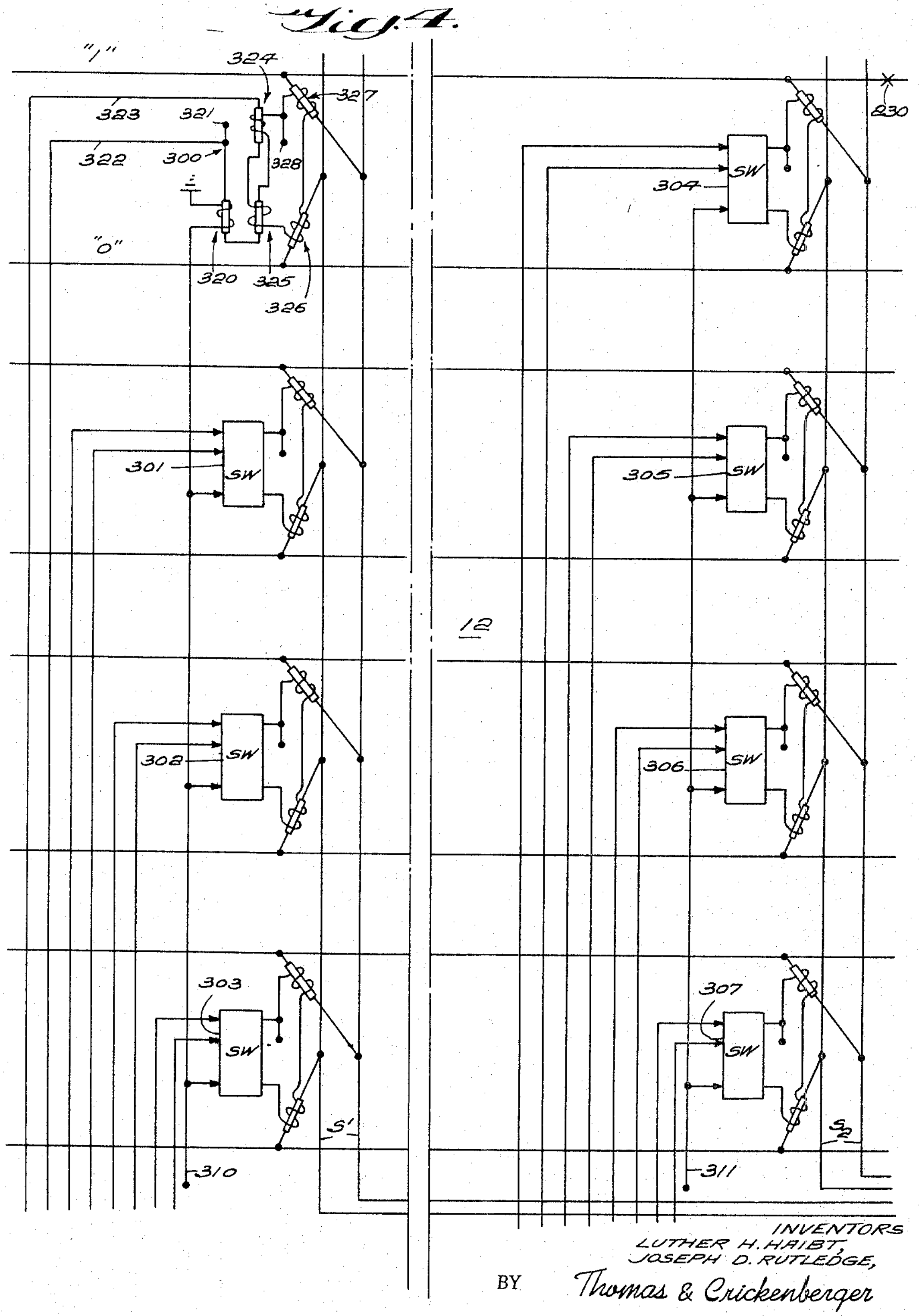
FIG. 4 shows in detail the replacement switch shown in block form on the sending plate in FIG. 1.
Figure 5:
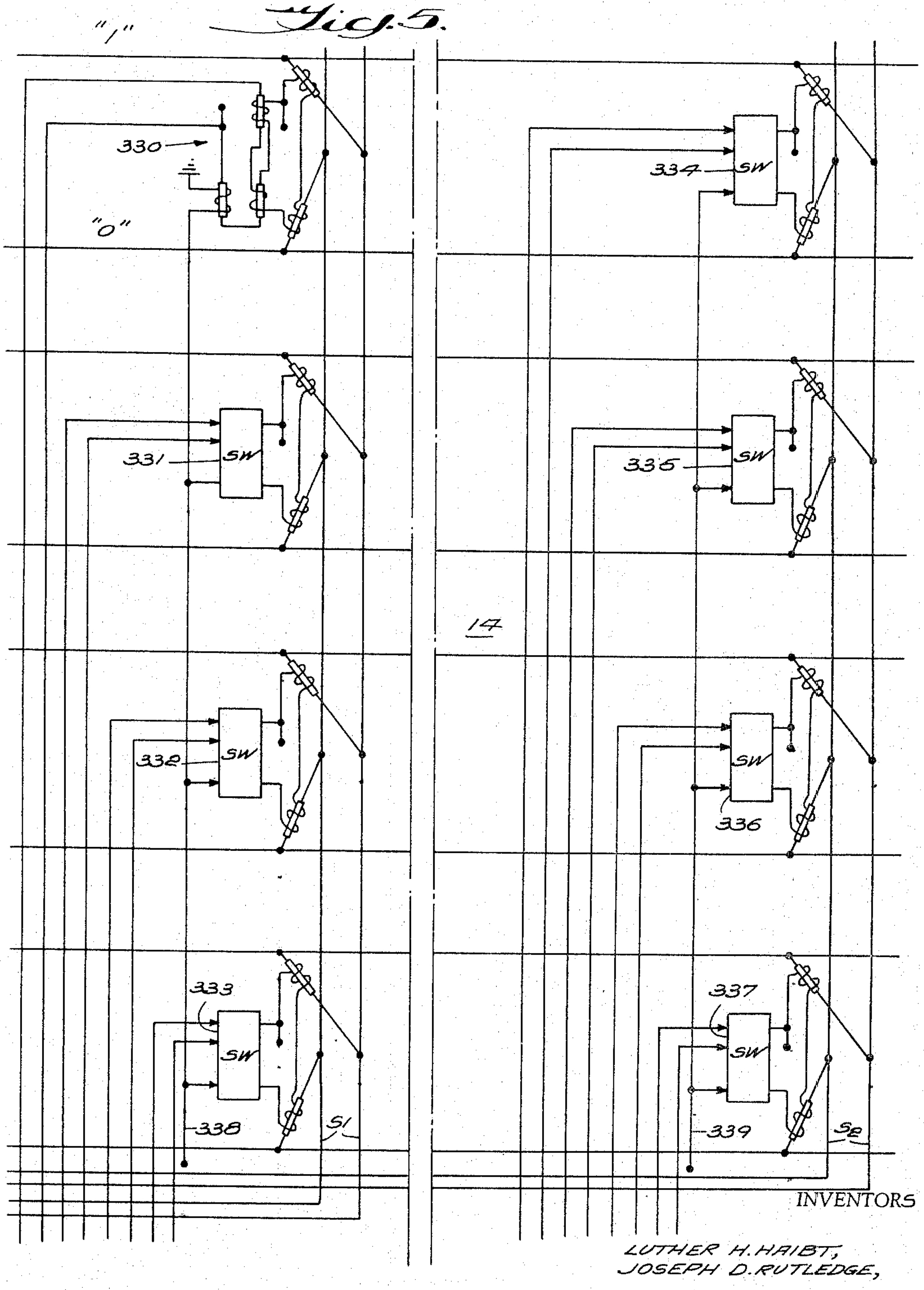
FIG. 5 depicts in detail the replacement switch shown in block form on the receiving plate in FIG. 1.
Figure 6:
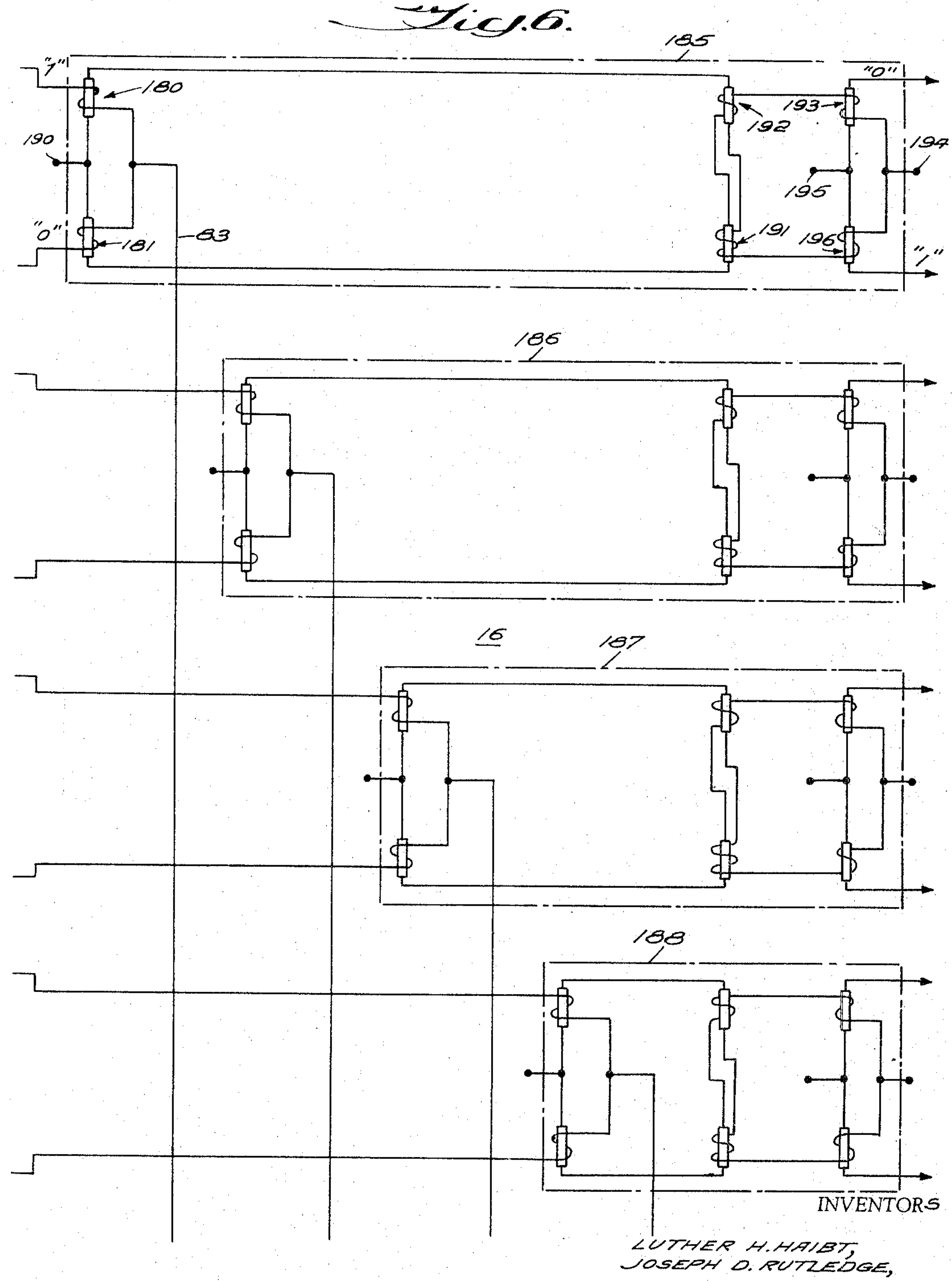
FIG. 6 illustrates in detail the receiving register shown in block form in FIG. 1.

When current flows on the One line of channel M1, this represents a binary one and when current flows on the Zero line, this represents a binary zero. Currents established on the One and Zero lines of channels M1 through M4 pass through the replacement switch 12 in FIG. 4 and the replacement switch 14 in FIG. 5 to the input cryotrons of respective flip-flops 185 through 188 in FIG. 6. The flip-flops 185 through 188 are manipulated to represent the same information as represented by corresponding flip-flops 140 through 143. To illustrate, let it be assumed that the coil of the cryotron 180 in the flip-flop 185 is energized. This indicates that the flip-flop 140 in FIG. 3 holds a one. Hence the gate of the cryotron 180 is driven resistive and current from a terminal 190 is diverted through the superconductive path including the gate of the cryotron 181, the gate of a cryotron 191, the winding of a cryotron 192, and the winding of a cryotron 193 to an exit terminal 194. As a result current from a terminal 195 is diverted by the resistance of the gate of the cryotron 193 through the superconductive gate of a cryotron 196 to the one output line of the flip-flop 185. Whenever the flip-flop 140 in FIG. 3 holds a Zero, the winding of the cryotron 181 of the flip-flop 185 in FIG. 6 is energized, and current from a terminal 190 is diverted by the resistance of the gate of the cryotron 181 through the superconductive path including the gate of the cryotron 180, the gate of the cryotron 192, the winding of the cryotron 191, the winding of the cryotron 196 to an exit terminal 194. Accordingly, current from the terminal 195 is diverted by the resistance of the gate of the cryotron 196 through the superconductive gate of the cryotron 193 to the Zero output line of the flip-flop 185. It is seen, therefore, that the flip-flop 185 in FIG. 6 assumes the same state held by the flip-flop 140 in FIG. 3. The flip-flops 186 through 188 in FIG. 6 perform in like fashion to hold the same information represented by corresponding flip-flops 141 through 143 in FIG. 3. The description thus far has been concerned with the transmission of information from the sending register 10 in FIG. 3 along the channels M1 through M4 through FIGS. 5 and 6 to the receiving register 16 in FIG. 6. The sending register in FIG. 3 and the replacement switch in FIG. 4 are disposed on a sending plate as illustrated in FIG. 1, and between the replacement switch 12 in FIG. 4 and the replacement switch 14 in FIG. 5 are disposed interplate wires which serve as channel lines which convey current through the replacement switch 14 in FIG. 5 to the receiving register 16 in FIG. 6, the latter two elements being disposed on a receiving plate as depicted in FIG. 1. Should one of the interplate wires be broken while it is carrying current representative of information, erroneous data may be indicated by the receiving register in FIG. 6. It is a feature of this invention therefore to detect such a condition and to correct it. The detection of a fault is made by the detection and sequence circuit 30 in FIG. 7 and the detection and sequence circuit 90 in FIG. 10 both of which operate simultaneously when a fault occurs. It is appropriate at this point to inquire first into the details of the construction and operation of the detection and sequence circuit 30 in FIG. 7. The detection and sequence circuit 90 is different in its construction and operation from the detection and sequence circuit 30, and the detection and sequence circuit 90 is described subsequently.

Figure 7:
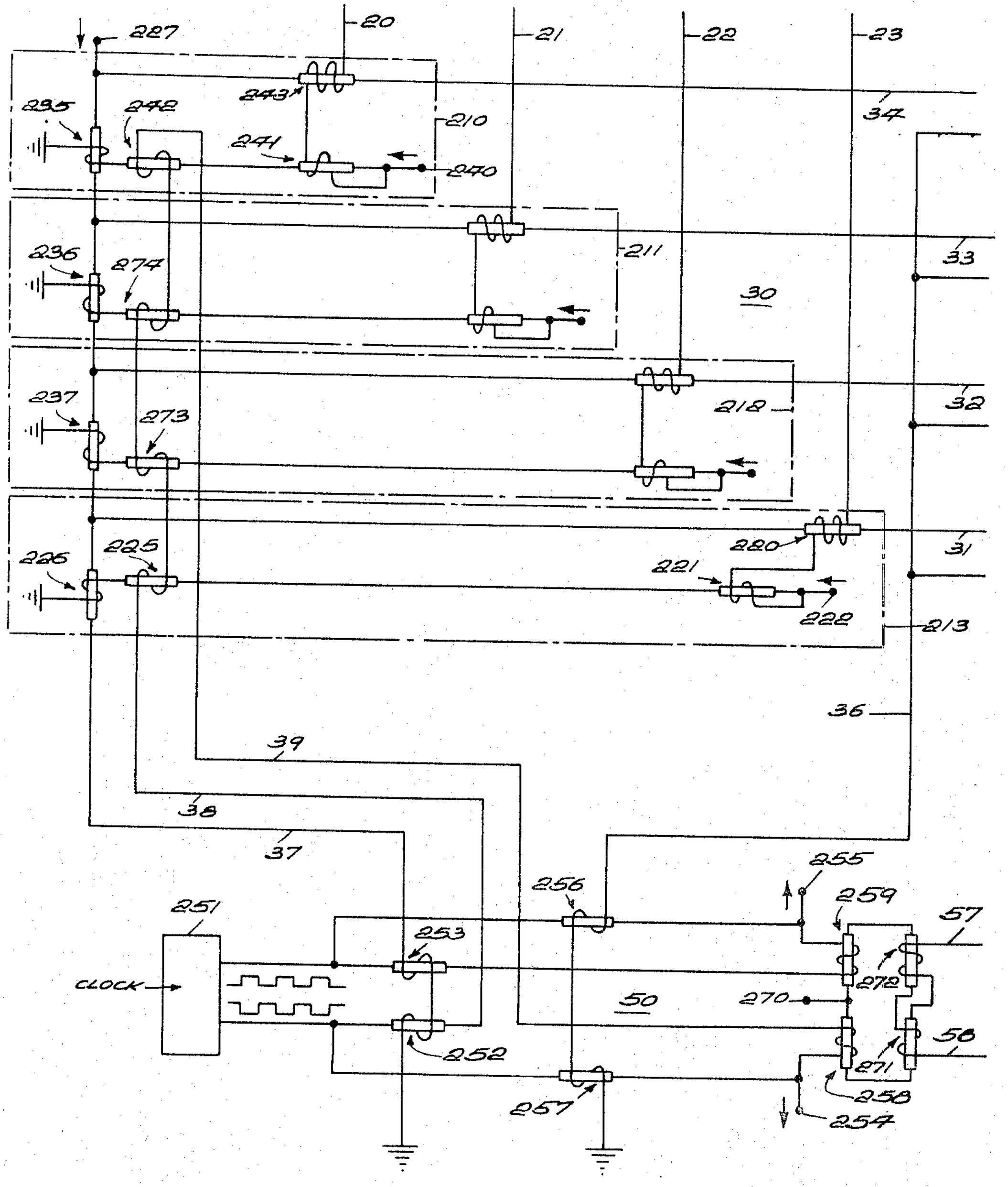
FIG. 7 shows the details of the detection sequence circuit and the shift register control which are shown in block form on the sending plate in FIG. 1.

Referring next to FIG. 7, the detection and sequence circuit 30, illustrated in block form in FIG. 1, is shown in detail in the upper portion of this drawing. It includes circuits 210 through 213 which act as detectors to indicate a fault in associated channels M1 through M4, and these circuits constitute a matrix arrangement which determines the order or sequence in which the various channels are corrected should multiple faults occur simultaneously. Concerning the detection operation performed by these circuits, it is felt that an explanation of the construction and operation of one of these circuits should suffice for an understanding of the remaining ones. Taking the circuit 213 for illustrative purposes, it includes a pair of cryotrons 220 and 221 arranged as shown. Current from a terminal 222 normally flows through the winding of the cryotron 221, through the winding of the cryotron 220 and along the line 23 to the buffer 145 in FIG. 3. When there is no fault in channel M1, current from the terminal 222 in FIG. 7 flows in the manner indicated to FIG. 3 and then along the One or Zero line of channel M1 to represent information conveyed by this channel. The detection circuit 213 further includes cryotrons 225 and 226 connected as shown. The cryotron 225 acts as a reset cryotron for the detection circuit 213, and the cryotron 226 is operated during a fault to divert current from a terminal 227 through the gate of the cryotron 220 and along the line 31 to operate the replacement switch control 70 in FIG. 8.

In order to illustrate the operation of the detection circuit 213, let it be assumed that channel M1 is carrying a current on the One line. Accordingly, current from the terminal 222 of the detection circuit 213 in FIG. 7 flows through the coils of the cryotrons 221 and 220, through the gate of the cryotron 171 of the buffer 145 in FIG. 3, and to the One line of the channel M1. Current flows along this line through FIGS. 4, 5, 6 and 10 as previously indicated. Let it be assumed that at this instant a break occurs in the One line of channel M1 at a point 230 in FIG. 4. As a result current can no longer flow in the One line of channel M1 but must flow through the resistive gate of the cryotron 170 of the buffer 145 in FIG. 3 along the Zero line of channel M1. The current on the Zero line flows through FIGS. 4 and 5, through the winding of the cryotron 181 of the flip-flop 185 in FIG. 6 and then to ground in FIG. 10 as earlier explained. Since the current now flows through the resistive gate of the cryotron 170 in FIG. 3, it is reduced in amplitude. This reduction in amplitude of the current is enough that the magnetic fields produced around the coils of the cryotrons 221 and 220 of the detection circuit 213 in FIG. 7 is less than the critical field, i.e., not sufficient to hold the gate elements of these cryotrons resistive. Accordingly, the gates of the cryotrons 221 and 220 become superconductive, and current from the terminal 222 is prevented from flowing through the Zero line of the channel M1 because of the resistive gate of the cryotron 170 of the buffer 145 in FIG. 3. Hence current from the terminal 222 in FIG. 7 flows through the superconductive gate of the cryotron 221, the superconductive gate of the cryotron 225 and the superconductive winding of the cryotron 226 to ground. The current in the winding of the cryotron 226 causes its gate to become resistive. If the cryotrons 235 through 237 have superconductive gates and such is the case if no other faults exist, the current from the terminal 227 in FIG. 7 is diverted by the resistance of the gate of the cryotron 226 to the superconductive gate of the cryotron 220 and along the line 31 to operate the replacement switch 70 in FIG. 8 thereby to effect a repair operation as explained subsequently. Let it be assumed at this point that the defect is corrected by switching a spare channel to the defective channel M1. The One line of channel M1 again presents a continuous path which is superconductive, but current from the terminal 222 of the detection circuit 213 in FIG. 7 may not flow in this path because it is flowing in a superconductive path through the gate of the cryotron 221, the gate of the cryotron 225 and the winding of the cryotron 226 to ground. A pulse from the clock of the shift register control 50 in FIG. 7 sends a pulse through the winding of the cryotron 225 which drives the gate of this cryotron resistive and diverts the current from the terminal 222 through the winding of the cryotrons 221 and 220 to the One line of channel M1, thereby indicating information correctly in channel M1. When current is diverted from the terminal 222 of the detection circuit 213 in FIG. 7 to the One line of channel M1, current no longer flows through the gate of the cryotron 221, the gate of the cryotron 225 and the winding of the cryotron 226. Accordingly, the gate of the cryotron 226 becomes superconductive again and the gate of the cryotron 220 becomes resistive again, thereby diverting current from the terminal 227 from the line 31 to the superconductive gate of the cryotrons 226. The current from the terminal 227 accordingly flows through the gate of the cryotron 226 to ground. It is seen, therefore, how the detection circuit 213 operates, and the detection circuits 210 through 212 operate in like fashion.

Should two or more errors occur simultaneously, the detection and sequence circuit 30 in FIG. 7 determines the order in which the channels are repaired. To illustrate this, let it be assumed that channel M1 and channel M4 develop broken interplate wires which are carrying current. Let it be assumed further that these breaks occur simultaneously. The detection circuit 213 performs as indicated above whereby the gate of the cryotron 226 becomes resistive because channel M1 is defective. In like fashion the gate of the cryotron 235 in the detection circuit 210 becomes resistive because the channel M4 is defective. This is because current from the terminal 240 of the detection circuit 210 is diverted from the defective channel M4 to the superconductive path which includes the gate of the cryotron 241, the gate of the cryotron 242 and the winding of the cryotron 235 to ground. The gate of the cryotron 243 becomes superconductive, and current from the terminal 227 is diverted by the resistive gate of the cryotron 235 through the superconductive gate of the cryotron 243 to the line 34. A repair operation is performed, and as soon as channel M4 is restored, the winding 242 of the detection circuit 210 is pulsed and current from the terminal 240 is returned to the superconductive path of the restored channel M4. As a result, current from the terminal 240 no longer energizes the coil of the cryotron 235, and its gate becomes superconductive; whereupon, current from the terminal 227 flows through the superconductive gates of the cryotrons 235, 236 and 237, and it is diverted by the resistance of the cryotron 226 through the superconductive gate of the cryotron 220 to the line 31. Another repair operation is performed, and as soon as the channel M1 is restored, a reset current pulse is applied to the winding of the cryotron 225. Consequently, current from the terminal 222 of the detection 213 is diverted back to channel M4 at which time the gate of the cryotron 226 becomes superconductive again, and current from the terminal 227 flows through the superconductive gates of the cryotrons 235, 236, 237 and 226 to ground. It is seen, therefore, that if channels M1 and M4 becomes defective simultaneously, channel M4 is corrected, then channel M1 is corrected. Should channels M1 through M4 become defective simultaneously, they likewise would be corrected in reverse order. While the sequence of correction is illustrated in reverse order this may be changed to any order desired by arranging the detection circuits 210 through 213 in the desired order from the terminal 227.

Figure 8:
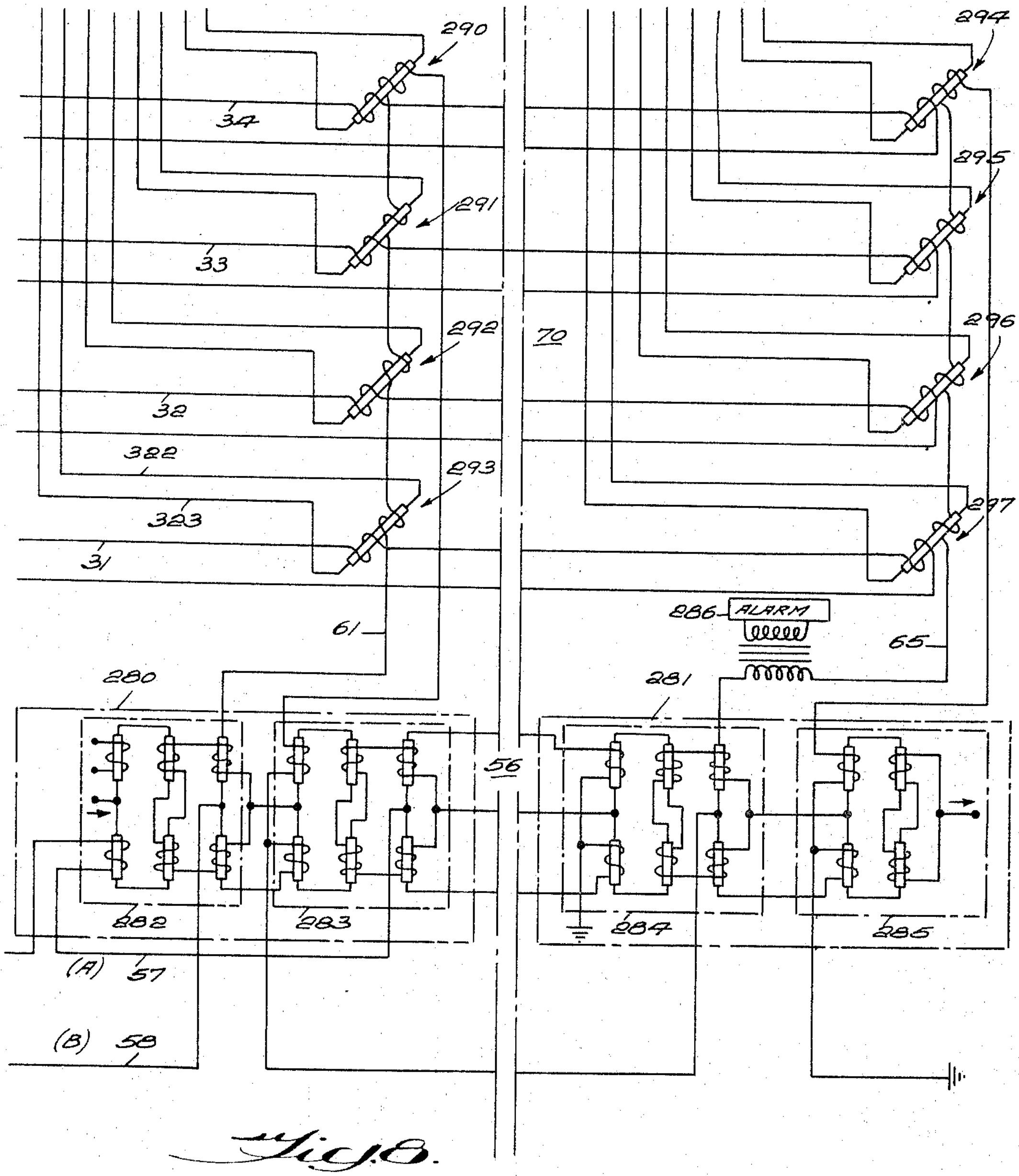
FIG. 8 shows the details of the replacement switch control and the shift register illustrated in block form on the sending plate in FIG. 1.

It is convenient at this point to inquire into the operation of the shift register control 50 in FIG. 7. A clock 251 supplies current pulses at alternate times to the gates of the cryotrons 252 and 253. During normal operation when no defects are present, current from the terminal 227 flows through the coils of these cryotrons to ground, and the resistance of their gates divert the pulses to the respective exit terminals 254 and 255. The pulses are hence uneventful. Whenever a defect occurs and the replacement switch control 70 in FIG. 8 is energized by current on one of the lines 31 through 34, a return path to ground for such current is provided through the line 36 and the coils of a pair of cryotrons 256 and 257. This current flows from the terminal 227 of the detection and sequence circuit 30 and is diverted from the line 37. Thus when a defect occurs the gates of the cryotrons 252 and 253 become superconductive, and the gates of the cryotrons 256 and 257 become resistive. The pulses from the clock 251 accordingly pass through the gates of the cryotrons 252 or 253 to energize the coils of resistive cryotrons 258 and 259 before exiting through the respective terminals 254 and 255. If a current pulse is applied to the gate of the cryotron 253 from the clock 251, it energizes the winding of the cryotron 259, driving the gate of this cryotron resistive. Current from the terminal 270 is thus diverted through the superconductive path including the gate of the cryotron 258, the gate of the cryotron 270, the winding of the cryotron 272 and along a line 57 to the shift register 56 in FIG. 8 to effect a shifting operation. Subsequently, the current pulse from the clock 250 to the cryotron 253 terminates, and a current pulse is applied to the gate of the cryotron 252. This current pulse flows through the gate of the cryotron 252, the windings of cryotrons 225, 273, 274 and 242 of the detection and sequence circuit 30, and then through the winding of the cryotron 258 of the shift register control 50 to the exit terminal 254. This pulse performs two functions. First, it pulses the windings of the cryotrons 225, 273, 274 and 242 of the detection and sequence circuit 30 to effect a reset operation whereby if a channel were previously defective and has been corrected, current is diverted back to the corrected channel in the manner previously explained. Second, the winding of the cryotron 258 is energized and its gate is driven resistive. This causes current from the current terminal 270 to be diverted through the superconductive path including the gate of the cryotron 259, the gate of the cryotron 272, the winding of the cryotron 271 and along the line 58 to the shift register 56 in FIG. 8 to cause a shift operation. It is seen, therefore, that the shift register control 50 in FIG. 7 responds to control currents on the lines 36 and 37 and operates the detection and sequence circuit so as to divert current back to a corrected channel and to operate the shift register 56 in FIG. 8.

Reference is made next to FIG. 8 for a discussion of the shift register 56 and the replacement switch control 70 both of which are shown in block form in FIG. 1. The shift register 56 supplies a current to a given one of the vertical lines 61 through 65 in FIG. 1. Only the lines 61 and 65 are illustrated in FIG. 8. The shift register 56 in FIG. 8 is similar to the one illustrated and described in the article "The Cryotron—A Superconductive Computer Component" in the proceedings of the IRE for April 1956 by D. A. Buck. Since this type of shift register is now well known and since it is described in the foregoing article, a detailed description of its construction and operation is unnecessary here. The shift register 56 is illustrated with two stages 280 and 281. The stage 280 includes a pair of flip-flops 282 and 283, and the stage 281 includes a pair of flip-flops 284 and 285. The shift register control 50 in FIG. 7 supplies current pulses alternately to the lines 57 and 58 in FIG. 8 to effect stepping of the shift register 56. Pulses on the line 57 may be termed A pulses, and pulses on the line 58 may be termed B pulses, consistent with the terminology employed in the aforementioned article. The shift register 56 is stepped once each time an A pulse and B pulse are applied. Initially the shift register 56 is reset, and the first pair of A and B pulses energizes the vertical line 61 in FIG. 8. The second set of A and B pulses energizes the line 65. While only two stages have been illustrated for the shift register 56, any number of stages may be employed in practice. This shift register serves to indicate the next spare channel which may be used to replace a defective channel. Hence the number of stages employed in the shift register should equal the number of spare channels. Initially when a defect occurs in any channel, the first stage of the shift register is operated to replace the defective channel with the first spare channel S1. Each time an error occurs thereafter, the shift register is stepped once. When the last spare channel has been used, the last stage 281 of the shift register 56 operates an alarm 286 to indicate that no further spare channels are available.

The replacement switch control 70 in FIG. 8 is illustrated with two columns of cryotrons with each cryotron having two windings. The gates of the cryotrons remain superconductive during error-free operation. Whenever either of the two windings on each cryotron is energized, the current in that winding produces a magnetic field which is not sufficient to drive the gate thereof resistive, but when both windings are energized with a current, the resultant magnetic field is sufficient to drive the gate resistive. In essence then the cryotrons are disposed in a matrix arrangement which requires coincident current energization of a column and a row in order to operate the selected cryotron to the resistive state. The left-hand column of the matrix arrangement includes cryotrons 290 through 293, and the right-hand column of the matrix includes cryotrons 294 through 297. Note that the right-hand winding of each cryotron is energized by a vertical line while the left-hand winding of each cryotron is energized by a horizontal line. A current on one of the horizontal lines 31 through 34 simultaneously with a current on one of the vertical lines 61 or 65 selects a given cryotron and changes its gate to the resistive state.

The replacement switch 12 in FIG. 4 includes two columns of switches. The left-hand column includes switches 300 through 303, and the right-hand column includes switches 304 through 307. Each of these switches is a cryogenic flip-flop which is initially reset so that both of its output windings are energized to hold the associated gates in the resistive state, thereby isolating spare lines from the channels M1 through M4. The switches 300 through 303 in the left-hand column are initially reset by pulsing a line 310, and the switches 304 through 307 in the right-hand column are initially reset by pulsing a line 311. Each of the cryotron switches 300 through 307 has one of its input cryotrons disposed in the matrix arrangement of the replacement switch control 70 in FIG. 8. A discussion of the construction and operation of one of the cryotron switches in FIG. 4 should suffice for an understanding of the construction and operation of the remaining switches.

Referring more specifically to the switch 300 in FIG. 4, a cryotron 320 and the cryotron 293 of the replacement switch control 70 in FIG. 8 serve as input cryotrons. The cryotron 300 in FIG. 4 is initially set to the Zero state by a current pulse applied on the line 310 to the winding of the cryotron 320. This current drives the gate of the cryotron 320 resistive, and current from the terminal 321 is diverted along a line 322 to the superconductive gate of the cryotron 293 in the replacement switch control 70 in FIG. 8. The current passes through this superconductive gate and is returned along the line 323 to the gate of a cryotron 324 in FIG. 4, then through the winding of a cryotron 325, the winding of a cryotron 326 and the winding of a cryotron 327 to an exit terminal 328. Accordingly, the gates of the cryotrons 325, 326 and 327 are held resistive, and the resistances of the gates in the cryotrons 326 and 327 prevent currents on the Zero and One lines of channel M1 from being diverted to the spare channel S1. In this condition the flip-flop switch 300 is said to be in the Zero state. Once the flip-flop 300 is set to the Zero state, the reset pulse on the line 310 in FIG. 4 may be terminated. Should a subsequent defect occur in channel M1, the line 31 to the replacement switch control 70 in FIG. 8 may be energized with a current, thereby energizing the left-hand coils of the cryotrons 293 and 297 with a field which is less than the critical field. If the shift register 56 supplies a current to the vertical line 61, the right-hand coils of the cryotrons 290 through 293 are energized with a current, but the magnetic field of the coils in each instance is less than the critical field. The total magnetic field, however, on the cryotron 293 exceeds the critical field because the fields of the coils of this cryotron are additive, and the gate of this cryotron is driven resistive. Whereupon, current from the terminal 321 of the flip-flop 300 in FIG. 4 is diverted through the superconductive gate of the cryotron 320, the superconductive gate of the cryotron 325, the winding of the cryotron 324 to the exit terminal 328. The gate of the cryotron 325 is held resistive and the gates of the cryotrons 324, 326 and 327 become superconductive. In this condition the flip-flop 300 is said to be in the One state, and current on the Zero or the One line of channel M1 may flow on the lines of the spare channel S1 since the gates of the cryotrons 326 and 327 are now superconductive. Once set in the One state, the cryotron 300 continues in that state. It is seen, therefore, how the cryotron 300 in FIG. 4 may be operated by the replacement switch control 70 in FIG. 8. In like fashion the flip-flop switches 301 through 307 may be operated. Note that any one of the flip-flops 300 through 303 may connect the spare channel S1 to its corresponding one of the channels M1 through M4, and any one of the switches 304 through 307 may connect the spare channel S2 to its corresponding one of the channels M1 through M4. The selected flip-flop switch is operated by changing it to the One state thereby switching the spare channel to the defective channel, and the remaining flip-flop switches in the same column continue in the Zero state thereby isolating the remaining channels from the given spare channel.

Referring next to FIG. 5, the replacement switch 14, illustrated in block form in FIG. 1, includes flip-flop switches 330 through 333 in the left-hand column and flip-flop switches 334 through 337 in the right-hand column. A line 338 is energized with a current to reset the flip-flop switches 330 through 333 in the Zero state, and a line 339 is energized with a current to set the flip-flop switches 334 through 337 in the Zero state. These switches of the replacement switch 14 in FIG. 5 are operated in the same manner as the switches in the replacement switch 12 in FIG. 4. Corresponding switches in each of the two replacement switches in FIGS. 4 and 5 are operated simultaneously. For example, whenever the switch 300 of the replacement switch 12 in FIG. 4 is operated, the switch 330 in the replacement of FIG. 5 is operated simultaneously so that both ends of the spare channel S1 are connected to the opposite ends of the defective channel M1. In essence then the spare channel S1 is shunted across the interplate portion of the channel M1.

Figure 9:
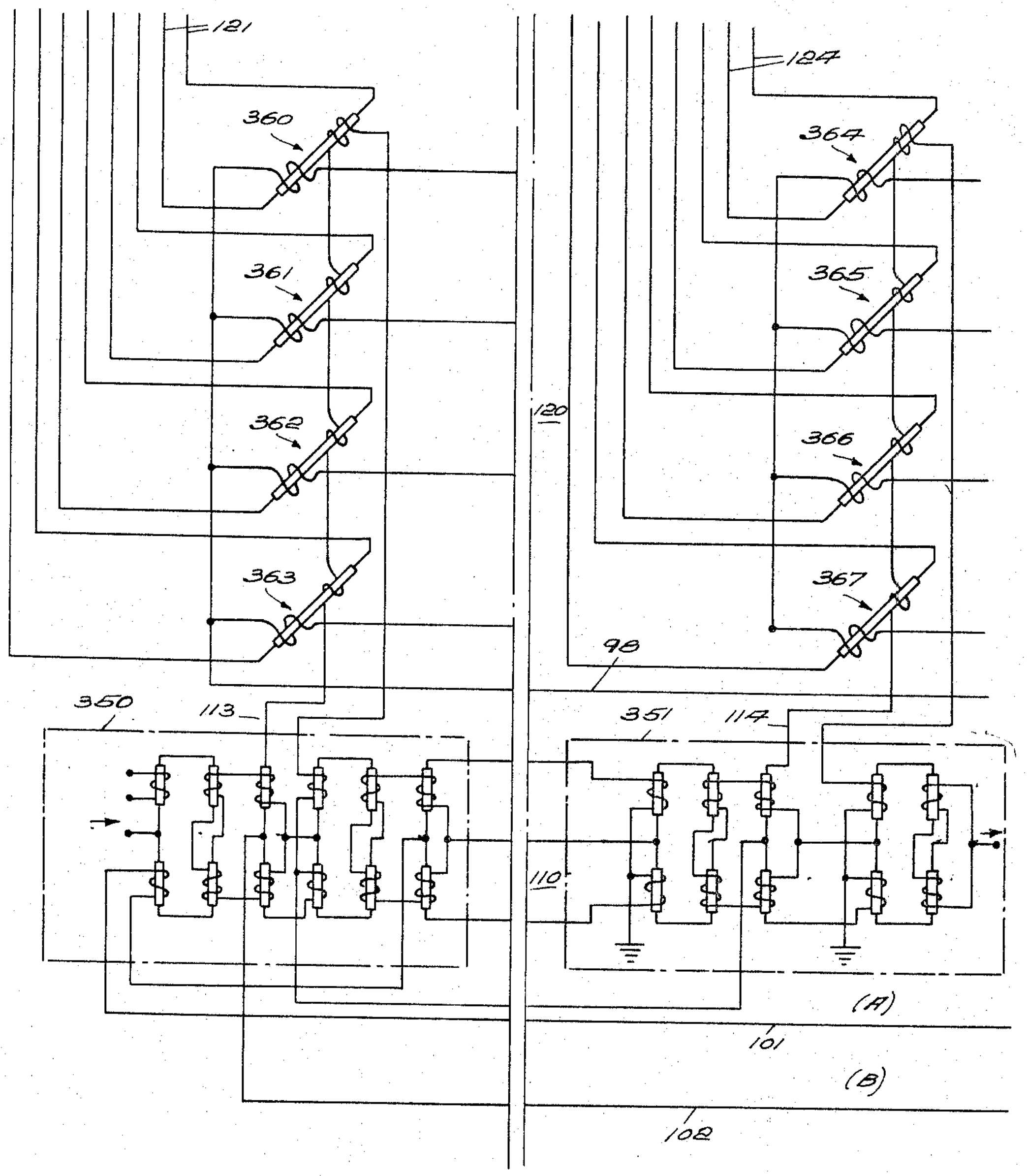
FIG. 9 depicts the details of the replacement switch control and the shift register which are illustrated in block form on the receiving plate in FIG. 1.

Referring next to FIG. 9, the shift register 110 and the replacement switch control 120, illustrated in block form in FIG. 1, are shown in detail. The shift register 110 is shown with two stages 350 and 351. The shift register 110 is identical in operation and construction to the shift register 56 in FIG. 8. The shift register 110 responds to alternate pulses on the lines 101 and 102 to energize the lines 113 and 114 in sequence. The shift register 110 in FIG. 9 is preferably operated in synchronism with the shift register 56 in FIG. 8. The line 113 from the shift register 110 energizes the right-hand coils of cryotrons 360 through 363, and current on the line 114 from the shift register 110 energizes the right-hand coils of the cryotrons 364 through 367 of the replacement switch control 120. The replacement switch control 120 is identical in construction and operation to the replacement switch control 70 in FIG. 8. The replacement switch control 120 in FIG. 9 responds to current on one of the lines 91 through 94 and current on one of the lines 113 or 114 to energize both coils of a selected cryotron. This drives the gate of the selected cryotron resistive and operates the associated one of the switches in the replacement switch 14 in FIG. 5 to change it from the Zero state to the One state, thereby switching the right-hand end of the selected spare channel to the defective channel.

Figure 10:
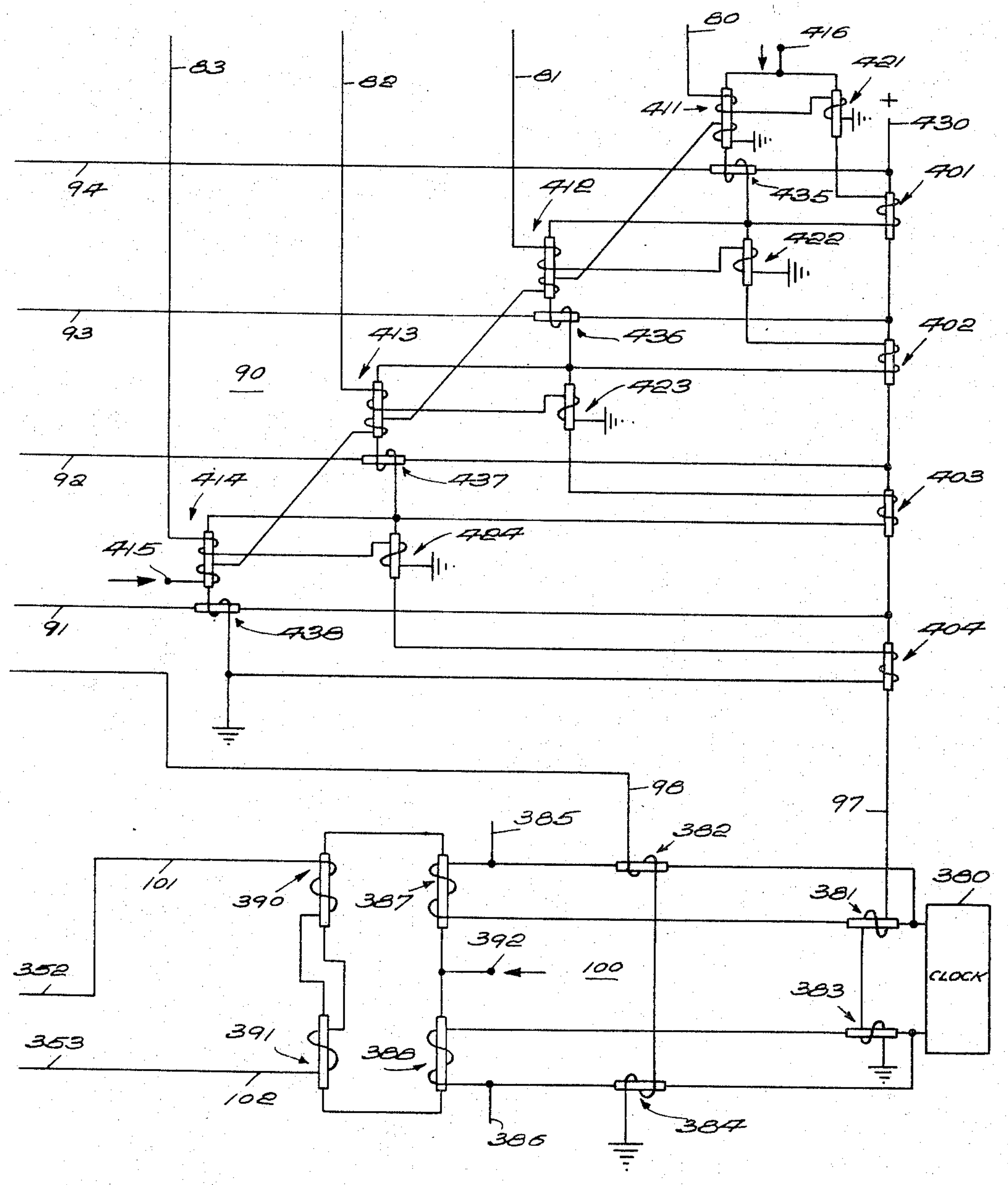
FIG. 10 illustrates the details of the detection and sequence circuit and the shift register control shown in block form on the receiving plate in FIG. 1.

Reference is made next to FIG. 10 for a discussion of the detection and sequence circuit 90 and the shift register control 100 illustrated in block form in FIG. 1. The shift register control 100 includes a clock 380 which supplies current pulses alternatively on its output leads. One current pulse is applied to the windings of the cryotrons 380 and 382; whereas the other current pulse is applied to the windings of the cryotrons 383 and 384. During error-free operation current is supplied on the conductor 97 to the windings of the cryotrons 381 and 383, driving their gates resistive. This diverts the current pulses from the clock 380 through the gates of the cryotrons 382 and 384 to respective exit terminals 385 and 386. The clock pulses are uneventful in this instance. When an error occurs, the line 98 is energized with a current which drives the gates of the cryotrons 382 and 384 resistive; whereupon, the current pulses from the clock 380 pass in one case through the gate of the cryotron 381 and the winding of a cryotron 387 to the exit terminal 385 and in the alternate case through the gate of the cryotron 383 and the winding of a cryotron 388 to the exit terminal 386. These pulses of current are effective to switch the state of the cryotrons 390 and 391. This causes current from a terminal 392 to be diverted alternately through the gates of cryotrons 387 and 388 to alternately change the state of the cryotrons 390 and 391 and thereby energize the lines 101 and 102 alternately with current pulses which are effective to step the shift register 110 in FIG. 9. When a fault is corrected, current flow in the line 98 to the shift register control 100 in FIG. 10 is terminated, and current flow in the lines 97 is again initiated. The clock 380 is preferably, though not necessarily, operated in synchronism with the clock 251 in FIG. 7.

The detection and sequence circuit 90 in FIG. 10 is different in its construction and operation from the detection and sequence circuit 30 in FIG. 7. The detection and sequence circuit 90 in FIG. 10 includes cryotrons 401 through 404 which determine the sequence in which multiple faults are corrected. Cryotrons 411 through 414 determine the channel in which a fault occurs. Each of these cryotrons includes an upper winding through which current in the respective channel flows. Each of these cryotrons includes a lower winding which is energized by current from a terminal 415. The current in the lower windings of the cryotrons 411 through 414 is sufficient in magnitude to create a magnetic field in excess of the critical field. The current in the upper windings of these cryotrons is likewise sufficient in magnitude to develop a magnetic field in excess of the critical field. The magnetic field in the upper winding of each cryotron is poled to oppose the magnetic field in the lower windings. Consequently, the two fields tend to cancel one another on each cryotron, and the resultant magnetic field is less than the critical field. Accordingly, the gates of the cryotrons 411 through 414 are superconductive during error-free operation. During such periods of error-free operation current from a terminal 416 flows through the gates of the cryotrons 411 through 414 to ground because the gates of the cryotrons 421 through 424 are held resistive by their respective channel currents. Because the gates of the cryotrons 421 through 424 are held resistive, no current from the terminal 416 flows through the windings of the cryotrons 401 through 404, and hence their gates are superconductive and permit current from a terminal 430 to flow therethrough and along the conductor 97 to ground. The current from the terminal 430 is not permitted to flow on to the lines 91 through 94 because the gates of respective cryotrons 435 through 438 are held resistive by the current from the terminal 416 which flows through the gates of the cryotrons 411 through 414.

In order to illustrate the overall operation of the device in FIGS. 3 through 10 and particularly the detection and sequence circuit 90 in FIG. 10, assume that channel M1 has a current flowing along its One line. This current flows along the One line of channel M1 through the winding of the cryotron 180 in FIG. 6, then along the line 83 in FIGS. 6 and 10 through the upper winding of the cryotron 414 and through the winding of the cryotron 424 to ground. Let it be assumed further that there are no defective channels. The current in the upper winding of the cryotron 414 creates a magnetic field which opposes that created by the lower winding of this cryotron. The resultant field is less than the critical field and the gate of the cryotron 414 is superconductive. The gates of the cryotrons 411 through 414 are likewise superconductive. The gate of the cryotron 424 is resistive because the current from the channel M1 is flowing in the winding thereof. Such is the case with the gates of the cryotrons 421 through 423. Accordingly, current from the terminal 416 flows through the gate of the cryotron 411, the winding of the cryotron 435, the gate of the cryotron 412, the winding of the cryotron 436, the gate of the cryotron 413, the winding of the cryotron 437, the gate of the cryotron 414 and the winding of the cryotron 438 to ground. Current from the terminal 415 flows through the lower windings of the cryotrons 411 through 414 at all times. Current from the terminal 430 flows through the superconductive gates of the cryotrons 401 through 404 and through the line 97 to ground. Assume at this point that the One line of channel M1 develops a break at point 230 in FIG. 4. As a consequence current in the line 23 in FIG. 3 can no longer flow through the superconductive gate of the cryotron 171, of the buffer circuit 145, and it flows through the resistive gate of the cryotron 170, along the Zero line of channel M1 through FIGS. 4 and 5, through the winding of the cryotron 181 in FIG 6, then along the line 83 in FIG. 10, then through the upper winding of the cryotron 414, and through the winding of the cryotron 424 to ground. The current is decreased in magnitude in the Zero line of channel M1 because the gate of the cryotron 170 in the buffer 145 of FIG. 3 is resistive. This reduction in current is enough for the gate of the cryotron 221 in the detection circuit 213 in FIG. 7 to become superconductive whereby current from the terminal 222 is diverted through the superconductive gate of the cryotron 221, the superconductive gate of the cryotron 225 and the winding of the cryotron 226 to ground. As a result current ceases to flow in the Zero line of the channel M1, and since the upper winding of the cryotron 414 in FIG. 10 now carries no current, the magnetic field of the lower winding of this cryotron, being unopposed, drives its gate resistive. Current from the terminal 416 in FIG. 10 flows through the superconductive gates of the cryotrons 411, 412 and 413, but it is diverted by the resistive gate of the cryotron 414 through the gate of the cryotron 424 and the winding of the cryotron 404 to ground. Since the gate of the cryotron 414 is resistive, no current flows through the winding of the cryotron 438. Current from the terminal 430 flows through the superconductive gates of the cryotrons 401 through 403, but it is diverted by the resistive gate of the cryotron 404 through the superconductive gate of the cryotron 438 along the line 91 to the replacement switch control 120 in FIG. 9. This current energizes the lower coils of the cryotrons 363 and 367 of the replacement switch 120 in FIG. 9 and returns along the line 98 through the windings of the cryotrons 382 and 384 of the shift register control 100 in FIG. 10 to ground. Since the line 97 carries no current, the gates of the cryotrons 381 and 383 are superconductive, and the gates of the cryotrons 382 and 384 are rendered resistive by the current flowing in the line 98. Pulses from the clock 380 now operate the cryotrons 387, 388, 390 and 391 to establish A and B pulses on respective lines 101 and 102. Let it be assumed that the shift register 110 has been initially set so that the first combination of an A and B pulse energizes the output line 113. Let it be assumed further that the shift register 56 in FIG. 8 has likewise been set initially so that the first combination of an A and B pulse energizes its output line 61. Accordingly, the cryotrons 293 and 363 in the respective replacement switches 70 and 120 are operated. Let it be assumed that the replacement switches 12 and 14 in respective FIGS. 4 and 5 are operated and that spare channel S1 is switched to the channel M1. Current flow is re-established in the One line of channel M1 by the detection circuit 213 in FIG. 7 whenever the next reset pulse is applied to the winding of the cryotron 225 by the shift register control 50 as previously explained. The re-established current in channel M1 flows through the upper winding of the cryotron 414 in FIG. 10 driving its gate resistive, and current flows through the winding of the cryotrons 424 driving its gate resistive. Current from the terminal 416 is diverted from the gate of the cryotron 424 and flows again through the gate of the cryotron 414 and the winding of the cryotron 438 to ground. Current from the terminal 430 in FIG. 10 is diverted from the line 91 by the resistive gate of the cryotron 438, and it flows through the super conductive gate of the cryotron 404 and the windings of the cryotrons 381 and 383 to ground. Pulses from the clock 380 are diverted through the superconductive gates of the cryotrons 382 and 384 to respective exit terminals 385 and 386. Note that the gates of the cryotrons 382 and 384 become superconductive when current is diverted from the line 91, and no further A and B pulses are supplied to shift register 110 in FIG. 9. It is seen therefore that the spare S1 channel is switched across the interplate wires of the defective M1 channel. It is readily seen that if channel M2 becomes defective, the cryotrons 413, 423, 403 and 437 perform in like fashion to the respective cryotrons 414, 424, 404 and 438 associated with channel M1. Should channel M3 develop a defect, the cryotrons 412, 422, 402 and 436 operate in like fashion to correct the defect, and the cryotrons 411, 421, 404 and 435 operate similarly to correct the defects in channel M4.

Accordingly, it is seen that an error-detection and correction device is provided according to this invention which eliminates the need for additional channels to carry code check bits and which may substitute any one of a plurality of space S channels for any one of a plurality of M information channels. The device is automatic in its operation, and it is able to correct multiple defects which occur simultaneously. The device is simple in construction and is adaptable to mass production techniques which provides a resultant reduction in cost of manufacture. To the extent that code channels have been eliminated and the construction simplified, the reliability of performance is improved.

What is claimed is:

1. A device for sending information signals from one location to another along a plurality of channels, the device including a sending mechanism and a receiving mechanism, a plurality of M information channels and a plurality of S spare channels disposed between said sending mechanism and said receiving mechanism, said sending mechanism including a sending register, a first detection and sequence circuit coupled to said sending register, a first replacement switch disposed between said sending register and said M information channels and said S spare channels, a first replacement switch control circuit coupled between said first replacement switch and said first detection and sequence circuit, said receiving mechanism including a receiving register, a second detection and sequence circuit coupled to said receiving register, a second replacement switch disposed between said receiving register and said M information channels and said S spare channels, a second replacement switch control circuit coupled between said second replacement switch and said second detection and sequence circuit, said first and second detection and sequence circuits responding to loss of amplitude in the information signals on one or more of said M information channels to operate automatically said first and second replacement switch control circuits which in turn automatically operate said first and second replacement switches to substitute any one of the S spare channels for any one of M informations channels, first and second storage means coupled to the respective first and second replacement switches for indicating the next available S spare channel, said first and second storage means being coupled to and operated by the respective first and second detection and sequence control circuits each time the first and second replacement switches are operated.

2. The apparatus of claim 1 wherein cryogenic devices are employed in its construction.

3. The apparatus of claim 2 wherein cryotrons are employed in the construction.

References Cited

UNITED STATES PATENTS

| | | | |
|---|---|---|---|
| 2,680,162 | 6/1954 | Brehm | 179—175.3 |
| 2,279,295 | 4/1942 | Blanton | 340—147 |
| 2,936,442 | 5/1960 | Christman et al. | 340—147 |
| 1,922,059 | 8/1933 | Ohl | 340—147 |
| 3,027,542 | 3/1962 | Silva | 340—146.2 X |
| 3,078,443 | 2/1963 | Rose | 340—146.1 |
| 3,011,711 | 12/1961 | Buck | 340—173.1 |
| 3,093,749 | 6/1963 | Dillingham | 340—173.1 X |
| 3,111,624 | 11/1963 | Farkas | 340—147 |

OTHER REFERENCES

Buck: "The Cryotron—A Superconductive Computer Component," proceedings of the I.R.E., vol. 44, No. 4, April 1956.

THOMAS B. HABECKER, *Acting Primary Examiner.*

EDWARD R. REYNOLDS, STEPHEN W. CAPELLI, NEIL C. READ, *Examiners.*

V. CARNEY, H. I. PITTS, *Assistant Examiners.*